United States Patent
Olliphant

(10) Patent No.: US 8,612,863 B2
(45) Date of Patent: Dec. 17, 2013

(54) METHODS AND SYSTEMS FOR SETTING AND ENABLING BADGES ON WEB PAGES

(75) Inventor: Hugo Olliphant, San Francisco, CA (US)

(73) Assignee: eBay Inc., San Jose, CA (US)

( * ) Notice: Subject to any disclaimer, the term of this patent is extended or adjusted under 35 U.S.C. 154(b) by 592 days.

(21) Appl. No.: 12/176,239

(22) Filed: Jul. 18, 2008

(65) Prior Publication Data

US 2010/0017217 A1    Jan. 21, 2010

(51) Int. Cl.
*G06F 3/00* (2006.01)
(52) U.S. Cl.
USPC .............................. 715/738; 715/744; 705/329
(58) Field of Classification Search
None
See application file for complete search history.

(56) References Cited

U.S. PATENT DOCUMENTS

| | | | |
|---|---|---|---|
| 2005/0033771 A1* | 2/2005 | Schmitter et al. | 707/104.1 |
| 2005/0251485 A1* | 11/2005 | Quigley | 705/53 |
| 2006/0282314 A1* | 12/2006 | Zamanian et al. | 705/14 |
| 2007/0210910 A1* | 9/2007 | Norstrom et al. | 340/506 |
| 2007/0260520 A1* | 11/2007 | Jha et al. | 705/14 |
| 2008/0059571 A1* | 3/2008 | Khoo | 709/203 |
| 2009/0006190 A1* | 1/2009 | Lucash et al. | 705/14 |
| 2009/0276345 A1* | 11/2009 | Hughes | 705/34 |

* cited by examiner

*Primary Examiner* — Kira Nguyen
(74) *Attorney, Agent, or Firm* — Schwegman Lundberg & Woessner, P.A.

(57) ABSTRACT

A charity badge may be set up for a web site of a publisher. The publisher may indicate a charity organization that the publisher wants to support. The charity badge may not be visible until an event occurs. The event may be a disaster event.

20 Claims, 11 Drawing Sheets

400

Sign Up | Log In | Help | Security Center    Search

U.S. English

405 What types of causes would you like to support?
- ☐ Disaster Relief
- ☐ Seasonal Giving 410 Which charities would you like to support?
- ☐ Red Cross
- ☐ Unitas
- ☐ Salvation Army

FIG. 4A

METHODS AND SYSTEMS FOR SETTING AND ENABLING BADGES ON WEB PAGES

TECHNICAL FIELD

The present application relates generally to the technical field of data processing and, in one specific example, to a method and system of conducting payment transactions.

BACKGROUND

When disasters (e.g., hurricane, storm, tsunami, etc.) strike, many establishments set up collection mechanisms to collect donations to support the victims. These mechanisms may include links on web sites to encourage donations electronically. For example, donations may be done via credit cards or via any other forms of monetary transfers including transfers from accounts associated with payment facilitators (e.g., PayPal Inc. of San Jose, Calif.). Unfortunately, when there are people making donations to the victims, there are also scammers that take advantage of the situations. These scammers may fraudulently claim that they collect the donations for the victims. Since the donation levels typically are at their highest immediately after the disasters struck, it is often difficult to quickly verify the scammers or where the donations go during that time. By the time the scams are detected, large amounts of donations have already been misdirected to the scammers and away from the victims.

BRIEF DESCRIPTION OF THE DRAWINGS

Some embodiments are illustrated by way of example and not limitation in the figures of the accompanying drawings in which:

FIG. 4A is a diagram that illustrates an example of a user interface that may be used to receive information about a badge to be generated, in accordance with some example embodiments.

DETAILED DESCRIPTION

For some example embodiments, methods and system to set up and to enable web-based badges are described. A web-based badge may be set up for a web site. A display area or a frame on a web page of a web site where the web-based badge is to be displayed may be determined. Code to display the web-based badge may be generated. The web-based badge may not be displayed or activated until an event occurs.

In the following description, for purposes of explanation, numerous specific details are set forth in order to provide a thorough understanding of example embodiments. It will be evident, however, to one skilled in the art that embodiments of the present invention may be practiced without these specific details.

Figure 1A:
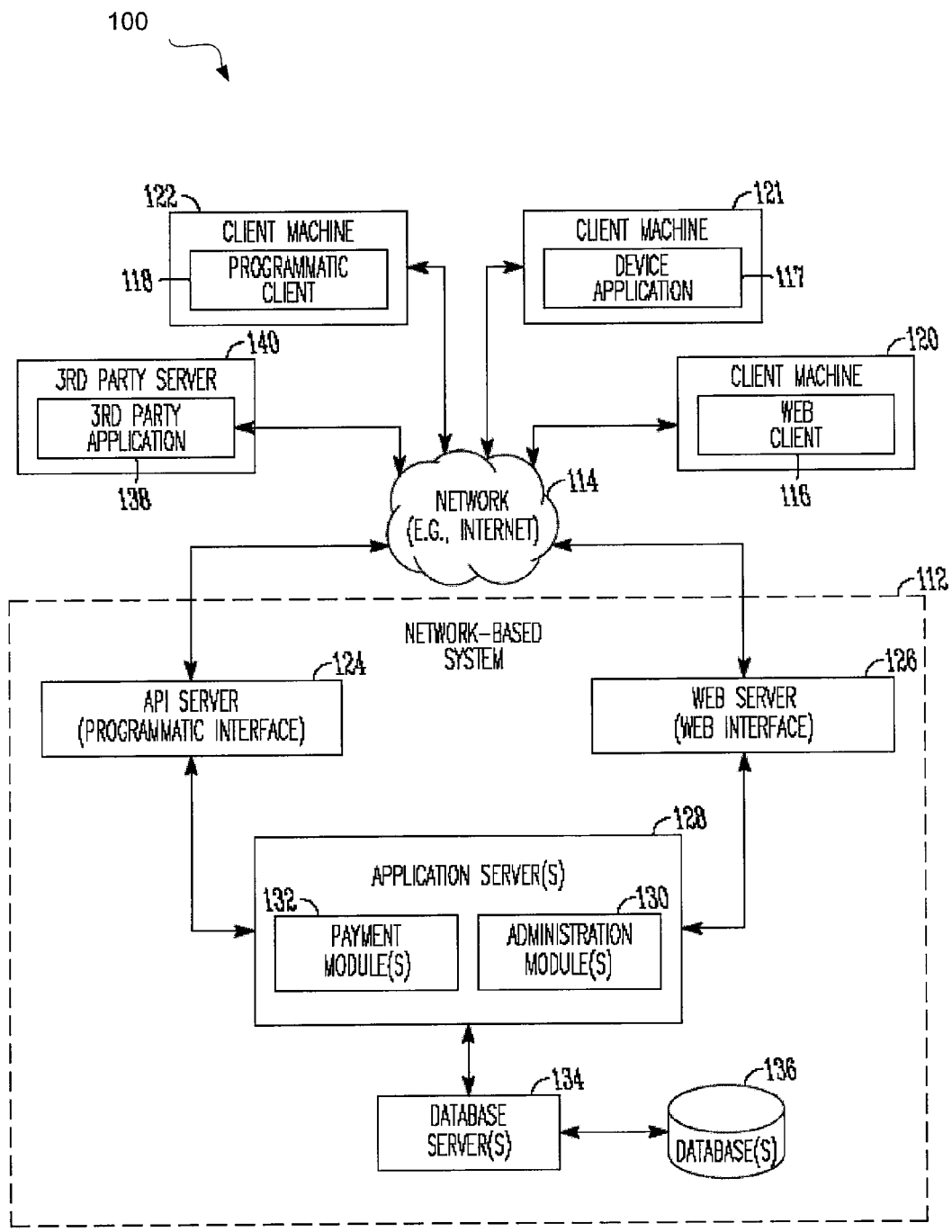
FIGS. 1A-1B illustrates network diagrams depicting a system, according to an example embodiment, having client-server architecture.

In example embodiments, a computer system (e.g., a client machine, server machine etc) configured by an application may constitute a "module" that is configured and operates to perform certain operations as described herein. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.
Platform Architecture FIG. 1A illustrates a network diagram depicting a system 100 having client-server architecture, according to an example embodiment. A system, in the example form of a network-based system 112, provides server-side functionality, via a network 114 (e.g., the Internet, a public or private telephone network (wired or wireless), a private wireless network using technologies such as Bluetooth or IEEE 802.11x or other networks) to one or more clients. FIG. 1A illustrates, for example, a web client 116 (e.g., a browser, such as the INTERNET EXPLORER® browser developed by MICROSOFT®) executing on client machine 120. A device application 117 may execute on a client machine 121. A programmatic client 118 may execute on client machine 122. Each of the client machines 120-122 may be referred to as a network-based machine. Further, while the system 100 shown in FIG. 1A employs client-server architecture, embodiments are of course not limited to such an architecture, and could equally well find applications in a distributed, or peer-to-peer, architecture system.

The client machines 120-122, may include a mobile device, a palmtop computer, a laptop computer, a desktop computer, a personal digital assistant, a cellular telephone, a communications device, a wireless telephone, a land-line telephone, a control system, a camera, a scanner, a television, television cable, a telephone with a web browser, a facsimile machine, a printer, a pager, and/or a personal trusted device. The client machines 120-122 may include a card, such as a smart card, a magnetic card, and/or a key card. The client machines 120-122 may include a telephone or any device capable of Short Messaging Service (SMS) messaging, multimedia messaging service (MMS) messaging and/or generating audio tones, such as dual-tone multi-frequency (DTMF) tones.

The client machines 120-122 may be browser-enabled. The client machines 120-122 may engage in an interactive message and/or open communication session, such as SMS, electronic mail, Extensible Hypertext Markup Language (xHTML), Wireless Application Protocol (WAP), web, interactive voice response (IVR) and/or other mobile interfaces.

The communication session between the client machines 120-122 and the network-based system 112 may involve multiple technology modalities. For example, a user of the client machines 120, 121 or 122 may engage the network-based system 112 via SMS and receive a responsive communication as an SMS with an embedded hyperlinked URL directing the client machines 120, 121, or 122 to a WAP or web page. A hyperlinked URL may be delivered directly to the client machines 120-122 from the application server(s) 128 and may be used to access a web site or a micro-browser, such as a WAP site. The client machines 120-122 may enable mobile videophone communications, digital television signals, and/or digital radio signals. The client machines 120-122 may include a receiver to receive near field communications.

Turning specifically to the network-based system 112, an Application Program Interface (API) server 124, and a web server 126 may be coupled to, and may provide programmatic interface and web interface to one or more application servers 128. The client machines 120-122 may use one or more of these interfaces to access the application server(s) 128.

For example, the web client 116 may access the application server(s) 128 via a web interface supported by the web server 126. The web interface may include a web browser or any micro-browser, such as xHTML or WAP. Similarly, the programmatic client 118 may access the various services and functions provided by the application server(s) 128 via the programmatic interface provided by the API server 124 and/or via the web interface provided by the web server 126. For an additional embodiment, an application supported by one or more applications of the application server(s) 128 may be downloadable to the client machines 120-122.

The client machines 120-122 may host the interface associated with the one or more applications of the application server(s) 128. The interface on the client machines 120-122 may be an API interface, an SMS interface, a web interface, and/or an IVR interface. Consumer wireless device platforms, such as Java 2 Platform Micro Edition (J2ME), J2SE and J2EE allow developers to use Java and a wireless toolkit to create applications and programs for the client machines 120-122. The J2ME interface may include an API for the client machines 120-122. The application of the programmatic client 118 may also access the network 114 using, for example, Binary Runtime Environment for Wireless (BREW).

The device application 117 executed on the client machine 121 may access the application server(s) 128 via the web interface of the web server 126. The device application 117 may be selected on the client machine 121 and launched in a background. The device application 117 may additionally or alternatively access the server(s) 128 via the programmatic interface of the API server 124. In an embodiment, the downloaded application described herein may include the device application 117.

The application server(s) 128 may host one or more administration module(s) 130 and one or more payment module(s) 132. The application server(s) 128 are, in turn, shown to be coupled to one or more database servers 134 that facilitate access to one or more databases 136. The account administration module(s) 130 may provide for administration of various accounts, as discussed in more detail herein.

A third party application 138 executing on a third party server 140 may offer goods and services to users of the client machines 120-122. The third party application 138 may have programmatic access to the network-based system 112 via the programmatic interface provided by the API server 124. The third party application 138 may be associated with a vendor, a merchant, or any organizations that may conduct transactions with the users of the client machines 120-122. For some example embodiments, the third party application 138 may be associated with an online marketplace (e.g., eBay, Inc. of San Jose, Calif.).

The payment module(s) 132 may provide a number of payment services and functions to the users of the client machines 120-122. The payment module(s) 132 may allow the users to accumulate value (e.g., in a commercial currency, such as the U.S. dollar, or a proprietary currency, such as "points") in accounts, and then later to redeem the accumulated value via several possible avenues. The payment module(s) 132 may also extend credit to a user and/or may also have access to other funding sources to complete transactions. Examples of the funding sources include a credit card, a bank account, and/or a credit line. The payment module(s) 132 may operate as a money transmitter.

A third party associated with the third party application 138 may conduct transactions with a user and may receive information from the payment module(s) 132. The information may include information regarding an order for a product, a service, a gift, a donation, etc. The information may also include shipment address specified by the user and payment status including payment confirmation. The payment module(s) 132 may secure financial information of the user with respect to the third party.

The client machine 120, 121, or 122 may host the interface associated with the payment module(s) 132 of the application server(s) 128. The web client 116, the device application 117, and/or the programmatic client 118 may be associated with the account management module(s) 130 and/or the payment module(s) 132.

The payment module(s) 132 may also be implemented as a standalone software program, which does not necessarily have networking capabilities. For this embodiment, the client machines 120-122 may be directly connected to the payment module(s) 132, without using the network 114.

The payment module(s) 132 may have access to the database 136 which may be coupled to database server(s) 134. The database 136 may include user account information. The user account information may include payment information, credit card information, checking account information, address information, etc.

The web client 116, the device application 117, and/or the programmatic client 118 may operate a program supported by the one or more database server(s) 134. The database server(s) 134 may support one or more account information links on a user interface of the client machines 120-122, for example, using the web client 116. By accessing the database server(s) 134, the user may add, amend or delete own account information including, for example, shipment address, payment method, etc.

The network 114 may include a mobile telephone network, a wireless wide area network (WWAN), a wired telephone network, a wireless local area network (wireless LAN or WLAN), a wireless Metropolitan Area Network (MAN), and/or a wireless personal area network (PAN) (e.g., a Bluetooth® network). Other network-based technologies that may be used to connect include PON, VSAT satellite, Micro-impulse Radar, Radio Frequency identification (RFID), Ultra-Wide Band, and/or Infrared. The client machines 120-122 may connect to the web using mobile internet exchange protocol such as, for example, Wireless Application Protocol (WAP) and/or Hypertext Transport Protocol (HTTP).

Figure 1B:
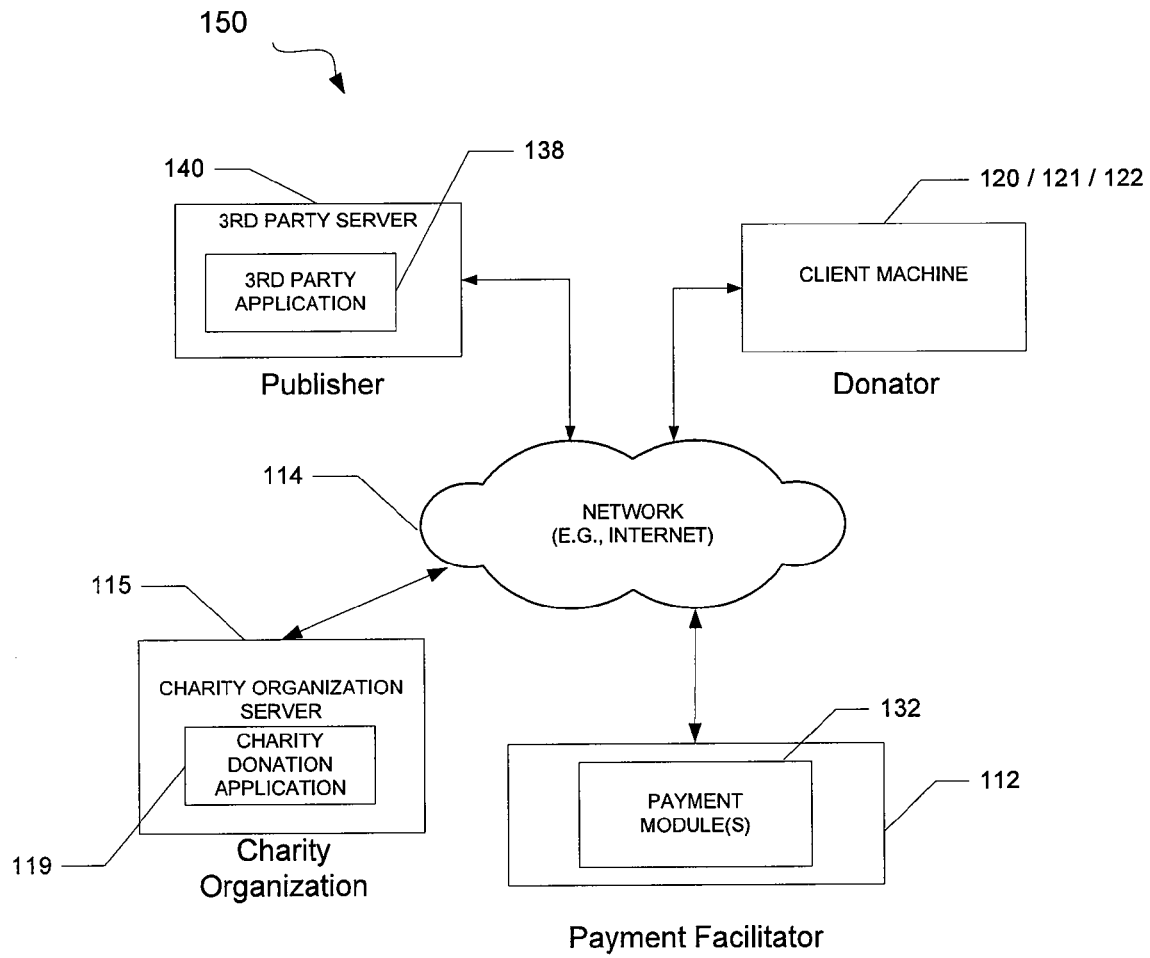

FIG. 1B illustrates another network diagram depicting a system 150, according to an example embodiment. The system 150 may be similar to the system 100 except for the addition of a charity organization server 115. The network 114 may allow the client machines 120-122 to communicate with the third party server 140 (e.g. a vendor/merchant server) and/or a charity organization server 115. The network 114 may also allow the client machines 120-122 to communicate with the application server(s) 128 of the network-based system 112. The charity organization server 115 may communicate with one or more of the application server(s) 128, the third party server 140, and the client machines 120-122. The charity donation application 119 may process donations received from the users via one or more of the third party server 140, the application server(s) 128, and the client machines 120-122. The charity organization server 115 may be associated with a charity organization such as, for example, the American Red Cross®.

For some example embodiments, a web site associated with the third party server 140 may include one or more web pages that display a web-based badge. A merchant, vendor or organization associated with the third party server 140 may also be referred to as a publisher. A user using one of the client machines 120-122 may see a web-based badge displayed on a webpage of the publisher and may initiate certain transactions as a result of having seen the web-based badge. For some example embodiments, a web-based badge may be a charity badge. The charity badge may be displayed when a disaster event occurs. For some example embodiments, the transactions initiated by the users may include donation transactions. The donations may be made to a charity organization associated with the charity badge.

For some example embodiments, donations may be made by selecting the charity badge. This may be accomplished by, for example, placing a cursor control pointer in or near a vicinity of the charity badge and selecting or pressing a button associated with the cursor control pointer. This may cause a transfer of funds in any currency to the charity organization via the services of the application server(s) 128 and the network 114. For some example embodiments, the transfer funds may require payment authorization by the user.

For some example embodiments, the publishers may collect the donations on behalf of the charity organization. As such, the payment authorization by the user may include authorizing the transfer of funds from an account of the user to an account of the publisher, with both accounts being associated with the payment facilitator 112. For some example embodiments, instead of having the publisher acting as a middleman, the transfer of funds may be from an account of the user to an account of the charity organization, with both accounts being associated with the payment facilitator 112.

Application Server(s)

Figure 2:
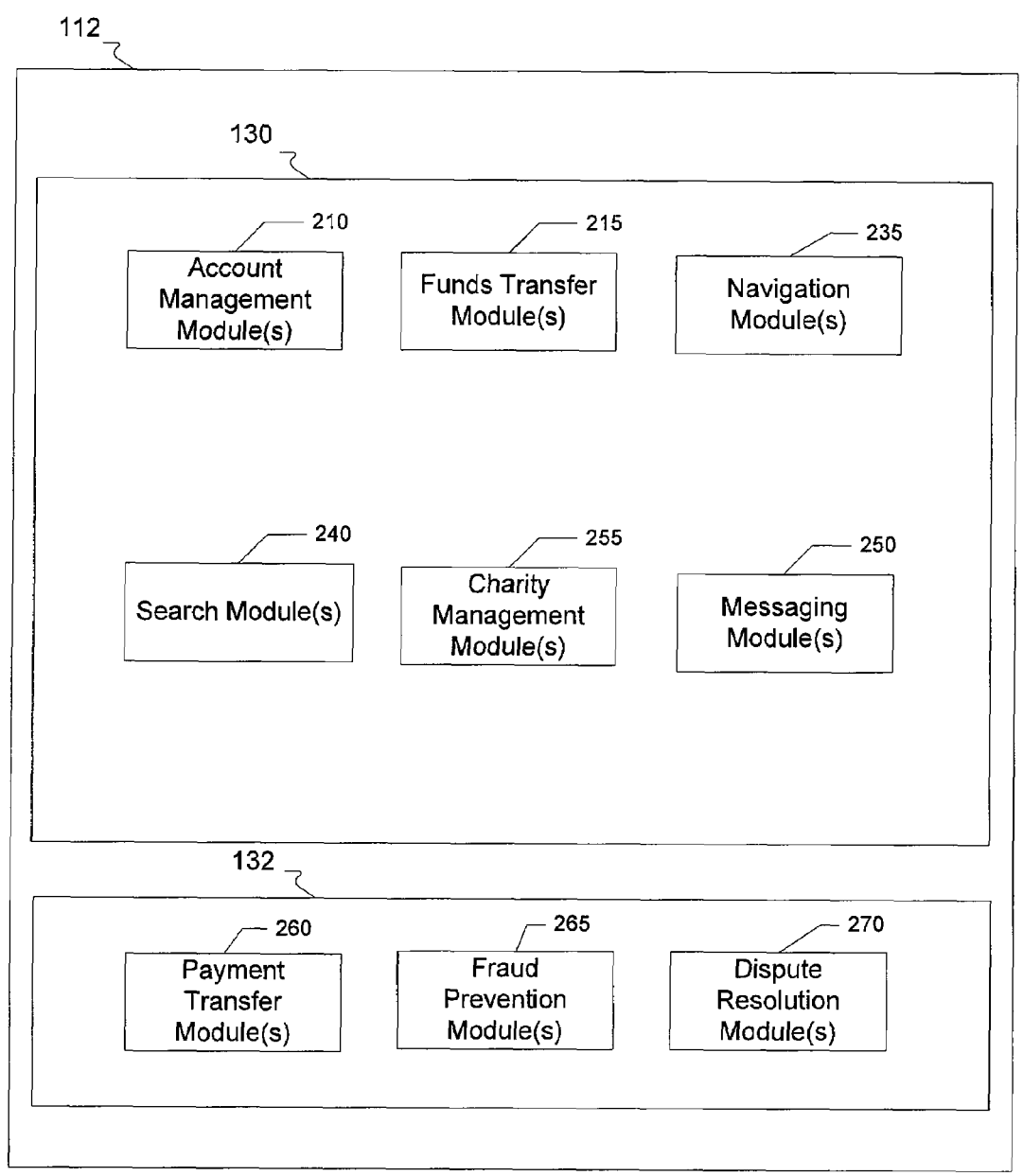
FIG. 2 illustrates a block diagram showing application servers, in an example embodiment.

FIG. 2 illustrates a block diagram showing application server(s) 128 that are part of the network-based system 112, in an example embodiment of the present invention. In this embodiment, the payment module(s) 132 and the administration module(s) 130 may be hosted by the application server(s) 128 of the network-based system 112.

The administration module(s) 130 illustrated in FIG. 1A may include account management module(s) 210, funds transfer module(s) 215, navigation module(s) 235, search module 240, and messaging module(s) 250. Other modules may also be included.

The account management module(s) 210 may be configured to set up manage, and control accounts for the users. For example, the account management module(s) 210 may enable a user to associate an account with a credit card. The account management module(s) 210 may have access to the database servers 134 to retrieve and to update account information.

The funds transfer module(s) 215 may be configured to transfer funds among the various accounts associated with the users (also referred to as account holders). For example, the transfer may be between an account of the user to an account of the third party or an account of the charity organization. The funds transfer module(s) 215 may include verification/approval operations. The verification/approval operations may analyze funds transfer and determine whether approval should be granted. For example, the verification/approval operations may block or limit funds transfer from a user account to an account previously marked as questionable. The verification/approval operations may generate warnings about pending funds transfer and may permit the account holder to override the warnings. The verification/approval operations may communicate with a third party application 138 executing on a third party server 140 to determine if there are any changes to pending transactions. The verification/approval operations may access a database associated with the third party server 140 or associated with the database server(s) 134.

The navigation module(s) 235 may enable browsing of various products, services, promotions, etc. published via the network-based system 112. The search module(s) 240 may allow the users to search for various categories that may be classified within the network-based system 112. Various other navigation modules may be provided to supplement the search and browsing operations.

The messaging modules 250 may be responsible for the generation and delivery of messages to the users and to the third parties of the network-based system 112. The messages may advise the users regarding the status of transactions associated with the network-based system 112. The messaging module(s) 250 may use SMS, UVR, email, or any other appropriate messaging module. Access to the messaging module(s) 250 may be granted, limited or restricted with respect to certain account holder as set in parameters defined by the other related account holder.

The payment module(s) 132 illustrated in FIG. 1A may include a payment transfer module 260, a fraud prevention module(s) 265, and/or dispute resolution module(s) 270.

The payment transfer module(s) 260 may transfer a payment from one of the user accounts discussed herein to the third party via the third party server 140 or to a charity via the charity organization server 115. The payment transfer module(s) 260 may utilize the approval/verification operations before transferring a payment.

The fraud prevention module(s) 265 may implement various fraud detection and prevention mechanisms to reduce the occurrence of fraud within the network-based system 112. The fraud prevention module(s) 265 may prevent fraud with respect to the third party and/or the user in relation to any part of the request, payment, information flows and/or request fulfillment. Fraud may occur with respect to unauthorized use of financial instruments, non-delivery of goods, and abuse of personal information. Fraud may occur with respect to using pretense to set up charity organization for the purpose of illegally collecting donations. Various techniques may be used to implement the fraud prevention module(s) 265 to detect and prevent or reduce fraud. For example, when an IP address associated with a web site that collects donation from United States citizens but is originated from outside the United States may be a sign of fraud.

The dispute resolution module(s) 270 may provide mechanisms whereby disputes arising between transacting parties may be resolved. For example, the dispute resolution modules 270 may provide guided procedures whereby the parties are guided through a number of steps in an attempt to settle a dispute. In the event that the dispute cannot be settled via the guided procedures, the dispute may be escalated to a mediator or arbitrator.

For some example embodiments, the administration module(s) 130 may include a charity management module(s) 255. The charity management module(s) 255 may perform operations that enable third parties via the third party server(s) 140 to more efficiently enable the users to donate to the charity organizations.

Charity Management Module(s)

Figure 3:
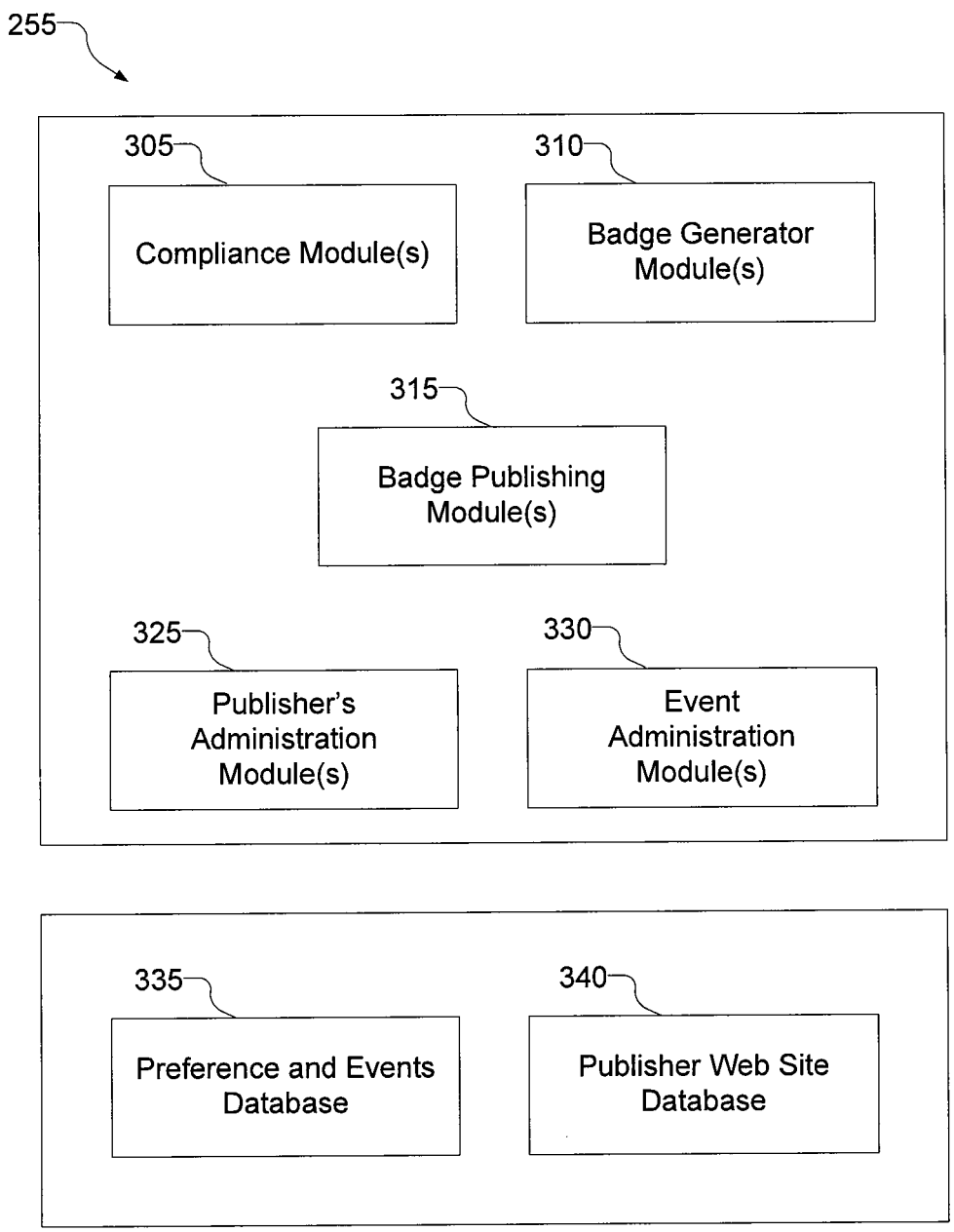
FIG. 3 illustrates a high-level diagram of the charity management module(s), in accordance with some example embodiments.

FIG. 3 illustrates a high-level diagram of the charity management module(s), in accordance with some example embodiments. For some example embodiments, the charity management module(s) 255 may include compliance module(s) 305, badge generator module(s) 310, badge publishing module(s) 315, donation receipt module(s) 320, publisher administration module(s) 325, and event administration module(s) 330.

The charity management module(s) 255 may have access to a preference and events database 335 and a publisher web site database 340. The preference and events database 335 and the publisher web site database 340 may be coupled to the database(s) 136 and may be associated with the database server(s) 134. The publisher web site database 340 may store information about the web sites of the publishers. The preference and events database 335 may store preference information of the publishers.

The compliance module 305 may perform operations to verify identity of the publishers and/or their web sites. For some example embodiments, the publishers may use the payment services of the payment module(s) 132 to conduct financial transactions with the users of the client machines 120-122. The financial transactions may include donations made by the users to the charity organizations. The compliance module 305 may perform operations to verify identity of the charity organizations to prevent fraud and may completely or partially deny any transfer of funds when fraud is detected. For example, the compliance module 305 may only allow the finds transfer to occur for up to a certain amount.

Determination of compliance may be based on a set of rules. For example, one such rule may require a charity organization to have a physical business address and a contact phone number in the United States. The compliance module 305 may perform operations that report frauds to an enforcement agency.

The badge generator module(s) 310 may perform operations that generate codes or scripts for charity badges. The codes are to be distributed to the publishers for displaying on one or more web pages. For example, the code generated by the badge generator module(s) 310 may include Hypertext Markup Language (HTML) code. The badge generator module(s) 310 may use preset badge size information to generate the code. There may be various badge sizes, and a publisher may indicate a preferred badge size.

Content of a charity badge may be generic or pre-determined and may or may not include information provided by the publishers. A pre-determined content may be, for example, donating to the American Red Cross. The information provided by the publisher may include, for example, name of the publisher for more customization. For example, the charity badge may indicate "Help eBay helps the victims of the Katrina hurricane—Donate to the American Red Cross."

A publisher may indicate names of the charity organizations (e.g., the American Red Cross, the Cancer Society, etc.) that the publisher wants to collect the donations for. Additionally or alternatively, a publisher may indicate regions (e.g., United States, Asia, China, worldwide, etc.) where events may occur and that the publisher wants to collect the donations for. This may be performed via the publisher's administration module 325 which may provide an interface for the publisher to select event types and/or charity organizations to support. The information may be stored in the preferences and events database 335. Some examples of recent events include the Tsunami in Asia, the Katrina hurricane in the United States, the earthquakes in China, etc. As an example, a publisher may collect donations for the American Red Cross to help victims of the earthquakes in China.

A publisher may indicate a location on a web page where the charity badge is to be displayed. It may be noted that because the decisions as to the size, placement (and in some situations the content) of the badge are made prior to an event occurs, there may be minimal delay before the charity badge is displayed.

The third party server(s) 140 may be associated with the publishers. For some example embodiments, the codes generated by the badge generator module(s) 310 may be transmitted to the third party server(s) 140 before an event occurs. An advantage of this technique is the readiness of the codes and the ability to display the charity badges with minimal delay. As mentioned above, the sooner a publisher displays a charity badge to collect donations for an event, the more donations may be received. For some example embodiments, the charity code may be installed on a web page associated with a publisher before any events occur. The installed charity codes may not be visible or activated. For some example embodiments, there may be an option to test the display of the charity badge. For example, the publishers may want to see if the charity badge blends with its neighboring images, etc. For some example embodiments, the charity codes may be transmitted and installed shortly after an event occurs. This may allow the charity codes to be updated with information about the event. For example, instead of a charity badge indicating "Donate to the American Red Cross", the charity badge may indicate "Help the victims of the Katrina hurricane, donate to the American Red Cross."

For some example embodiments, the publisher may need to place a snippet of codes on a web page where a charity badge is to be displayed. The snippet may include badge identification information and its height and width information. Following is an example of a snippet:

<script src="http://www.sourcesite.com/?pubid=12345&test=0&height=200&width=160">
</script>

The badge publishing module(s) 315 may cause or trigger a charity badge to be displayed on a web page. This may be in response to when a disaster event occurs. The badge publishing module(s) 315 may transmit an activation signal to cause a charity badge to be published (or activated, or become visible). It may be noted that the codes for the charity badge may have been previously transmitted and installed on the web page. It may be noted that the codes may be generated on behalf of multiple publishers (for example, when the codes are for generic charity badges). As such, the activation signal may be transmitted to cause web pages of multiple publishers to display the charity badges. When the codes to display the charity badge have not been previously transmitted, the badge publishing module(s) 315 may transmit and activate the codes shortly after the event occurs.

The event administration module(s) 330 may perform operations that enable an event administrator to specify information or attributes about events when the events occur. The information specified by the event administrator may trigger or activate a charity badge (via the badge publishing module(s) 315. The attributes may include, for example, type of event (e.g. natural disaster), geography of the event (e.g., Paraguay), and charity organizations that support the event (e.g., the American Red Cross). The information provided by the event administrator may be stored in the preferences and events database 335. For some example embodiments, the event administrator may be able to turn off selected events after certain time period, or when it is determined that the event is outdated.

For some example embodiments, the badge publishing module(s) 315 may compare the publisher's preferences (as stored in the preference and events database 335) and compares those to any events which have been specified by the event administrator. Following the example above, a publisher who has opted into natural disasters anywhere in the globe that are supported by the Red Cross would match the active event that was triggered in the above description. For some example embodiments, when there is no match for a given publisher, then the badge publishing module(s) 315 may transmit neutral or blank content into the script tag that the publisher installed or embedded into their web pages. Following is an example of a neutral script:

document.write(' ').

For some example embodiments, when the comparison described above results in a match, the badge publishing module(s) 315 may transmit a relevant script for the tag that the publisher installed or embedded into a web page. Following is an example of such a script:

document.write("<a href='http://charitybadge.paypallabs.com/?eventid=1234'><img src='http://charitybadge.paypallabs.com/charitybadge1234.gif'></a>").

It may be noted that the scripts described herein are examples and used for illustrative purposes only. For some example embodiments, the script may be developed as a flash widget installed onto the publisher's web page. The script may result in a charity badge appearing on the publisher's web site whenever a qualifying donation event occurs. Note that this type of service may be rendered through image tags or script tags.

Example User Interface

FIG. 4A is a diagram that illustrates an example of a user interface that may be used to receive information about a charity badge, in accordance with some example embodiments. Interface 400 may be associated with the publisher's administration module 325. The interface 400 may include event type input area 405 and charity organization input area 410. Although the interface 400 illustrates selection by check boxes, other techniques of displaying and enabling the selections (e.g., pull down list, radio buttons, free-form textual input, etc.) may also be used. For some example embodiments, the payment module(s) 312 (illustrated in FIG. 2) may be configured to recognize the charity organizations listed in the charity organization input area 410 so that donations (e.g., monetary donations) may be directed to these charity organizations. It may be necessary for these charity organizations to be account holders of the payment facilitator associated with the payment module(s) 312.

Figure 4B:
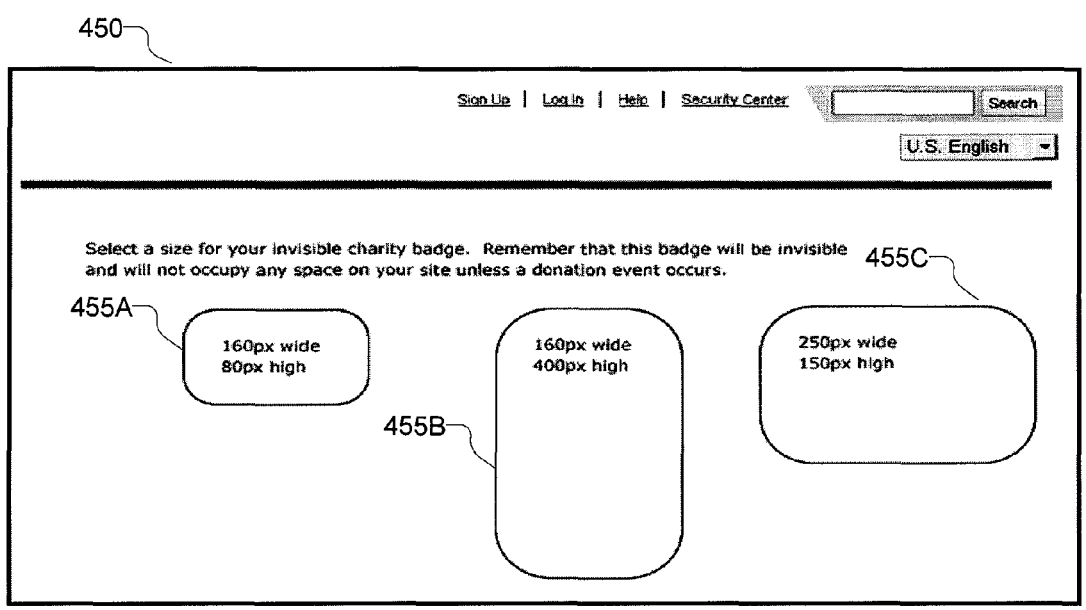
FIG. 4B is a diagram that illustrates an example of a user interface that may be used to receive information about format of a badge to be generated, in accordance with some example embodiments.

FIG. 4B is a diagram that illustrates an example of a user interface that may be used to receive information about format of a charity badge, in accordance with some example embodiments. The format of a charity badge may include, for example, its width and height in pixels. In the current example, there may be three different formats 455A-455C that a publisher may select. The number of formats may vary depending on the implementations. As mentioned above, selecting a format for a charity badge may not necessarily cause a charity badge to be displayed. An event may need to occur to trigger the selected charity badge to be displayed.

Example Web Page

Figure 5A:
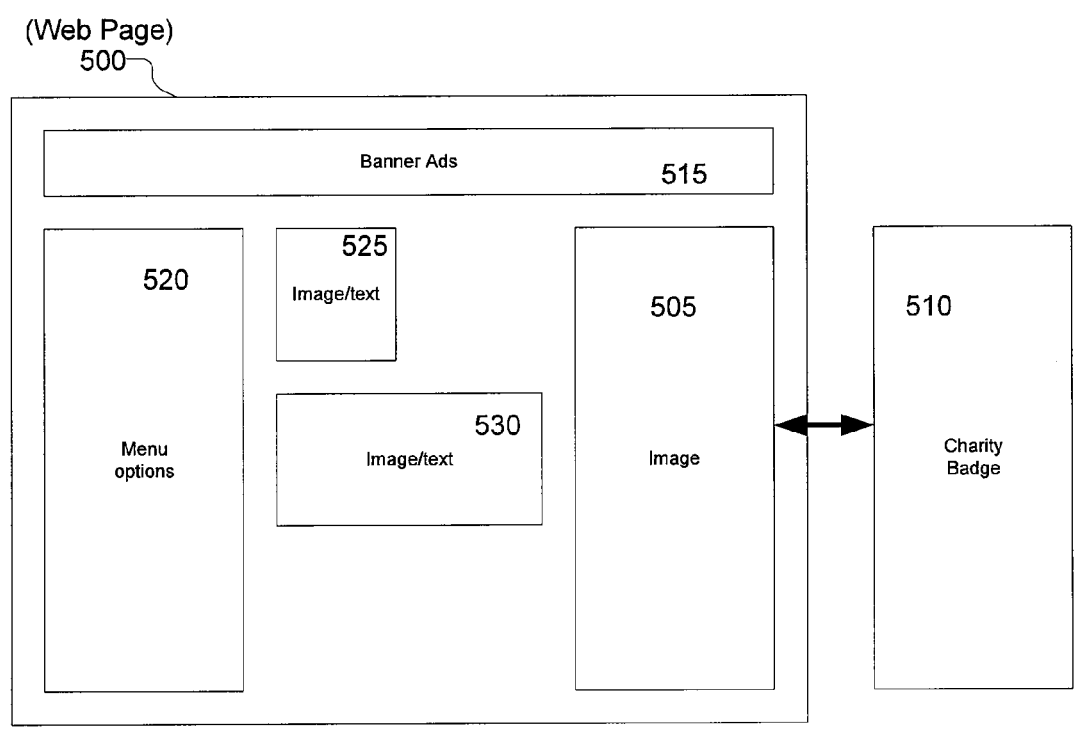
FIG. 5A illustrates an example web page where a badge may be displayed, in accordance with some example embodiments.

FIG. 5A illustrates an example web page where a charity badge may be displayed, in accordance with some example embodiments. Web page 500 may be associated with a web site of a publisher. In the current example, the publisher may be associated with an online store or marketplace. The web page 500 may include graphics and text information. For example, there may be a banner advertisement 515, a left column 520 to display menu options, and image and/or text frames 525, 530.

Also illustrated in FIG. 5A is a charity badge 510 which may be placed in the right column of the web page 500 where image 505 is currently occupying. For some example embodiments, when the charity badge 510 is not triggered or activated (and thus not visible), the image 505 may be visible. The image 505 may be associated with a product, or it may be associated with an advertisement. When an event occurs, the charity badge 510 is activated, and the image 505 is replaced by the charity badge 510. Different techniques may be used to activate the charity badge 510.

Figure 5B:
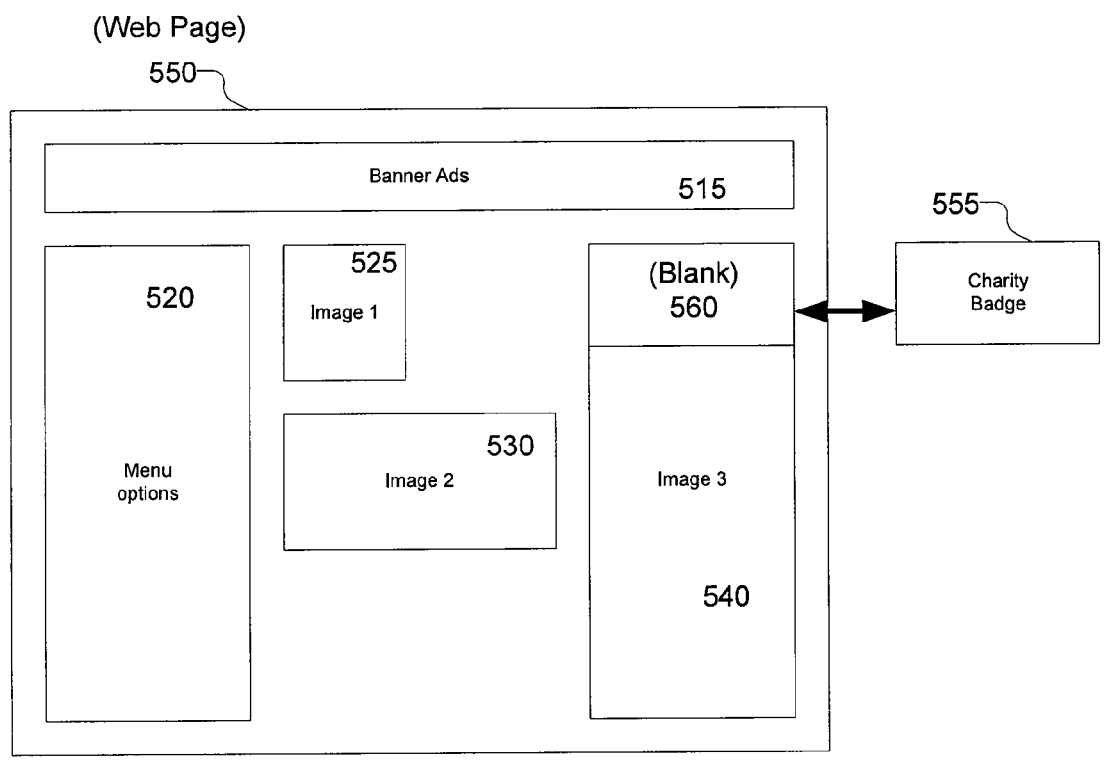
FIG. 5B illustrates another example web page where a charity badge may be displayed, in accordance with some example embodiments.

FIG. 5B illustrates another example web page where a charity badge may be displayed, in accordance with some example embodiments. Web page 550 may be mostly similar to the web page 500 except for the area where the charity badge 555 is displayed. In this example, the web page 500 may leave the area 500 blank when the charity badge 555 is not activated. For some example embodiments, the charity badge 555 may be displayed and expanded into the web page 500. In this scenario, it may not be necessary to have the area 500 blank. For example, when the charity badge 555 is displayed in a column on the right side of the web page 500, all other information currently in the column may be shifted (e.g., downward).

For some example embodiments, the charity badge 510 of FIG. 5A and 555 of FIG. 5B may become inactivated and invisible sometimes after the associated event occurs. This may be based on a predetermined period of time and/or this may be based on request of the publisher.

Flowcharts

Figure 6:
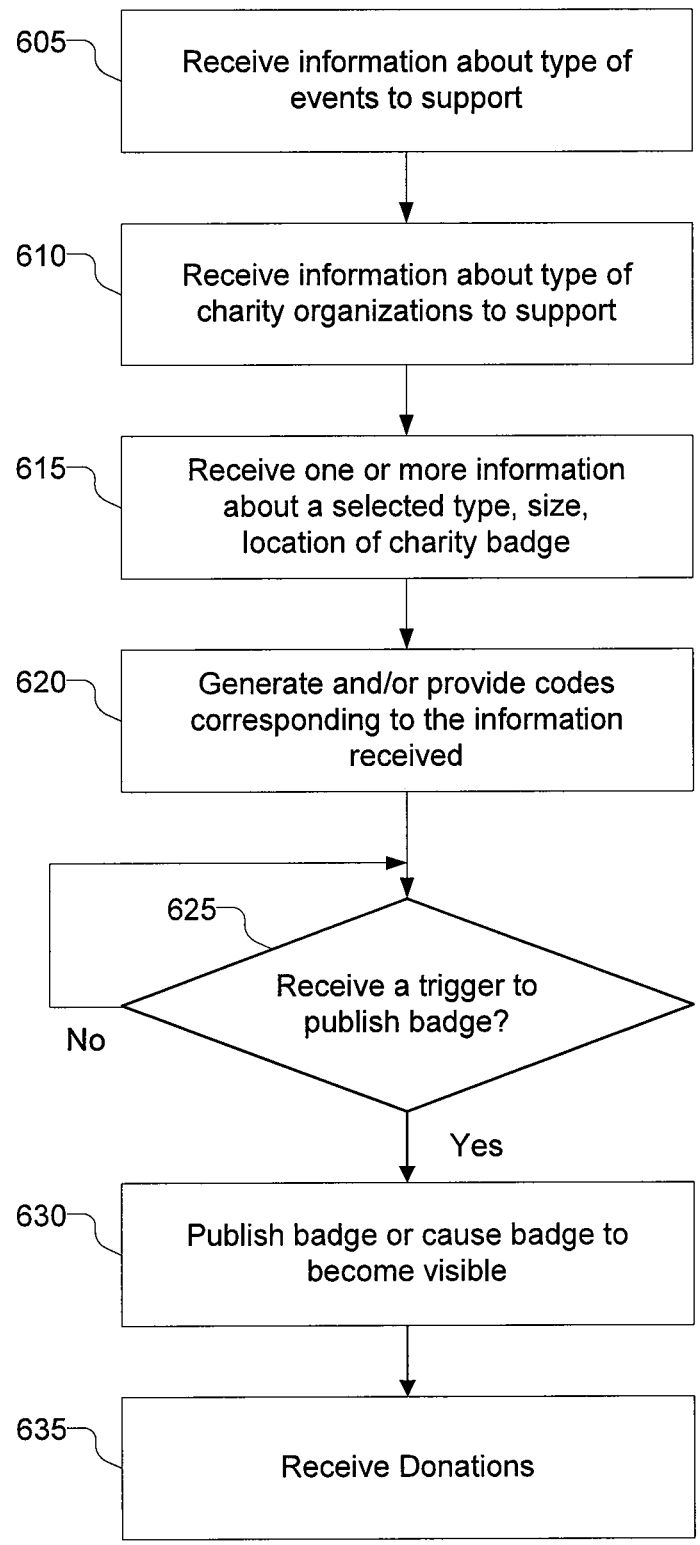
FIG. 6 illustrates a flow chart that may be used to receive information to generate a charity badge, in accordance with some example embodiments.

FIG. 6 illustrates a flow chart that may be used to receive information to generate a charity badge, in accordance with some example embodiments. The process may start at block 605 where the information about type of events to support may be received. At block 610, information about the types of charities to support may be received. For example, the type of events and the type of charity information may be received via the publisher's administration module(s) 325. The type of events and the type of charity information may be stored in the preference and events database 335. The publisher may also specify information about the publisher's web site. This information may be stored in the publisher web site database 340.

At block 615, information about the format of a charity badge may be received. This may include location information, size information, and type of events supported. The information may be received via the publisher's administration module 325. At block 620, the codes or scripts for a charity badge is generated. The codes may be generated by the badge generator module(s) 310.

At block 625, it is determined whether a trigger is received. The trigger may be associated with an occurrence of an event. For example, the event may be a disaster event. Information about the disaster event may be entered via the event administration module(s) 330.

When there is no trigger, the charity badge may not be published. When there is a trigger, the process may flow from block 625 to block 630 where the charity badge may be published or caused to become visible. For example, the charity badge may be published by the badge publishing module(s) 315. At block 635, donations may be received. For example, the donations may be received via the payment module(s) 132.

Figure 7:
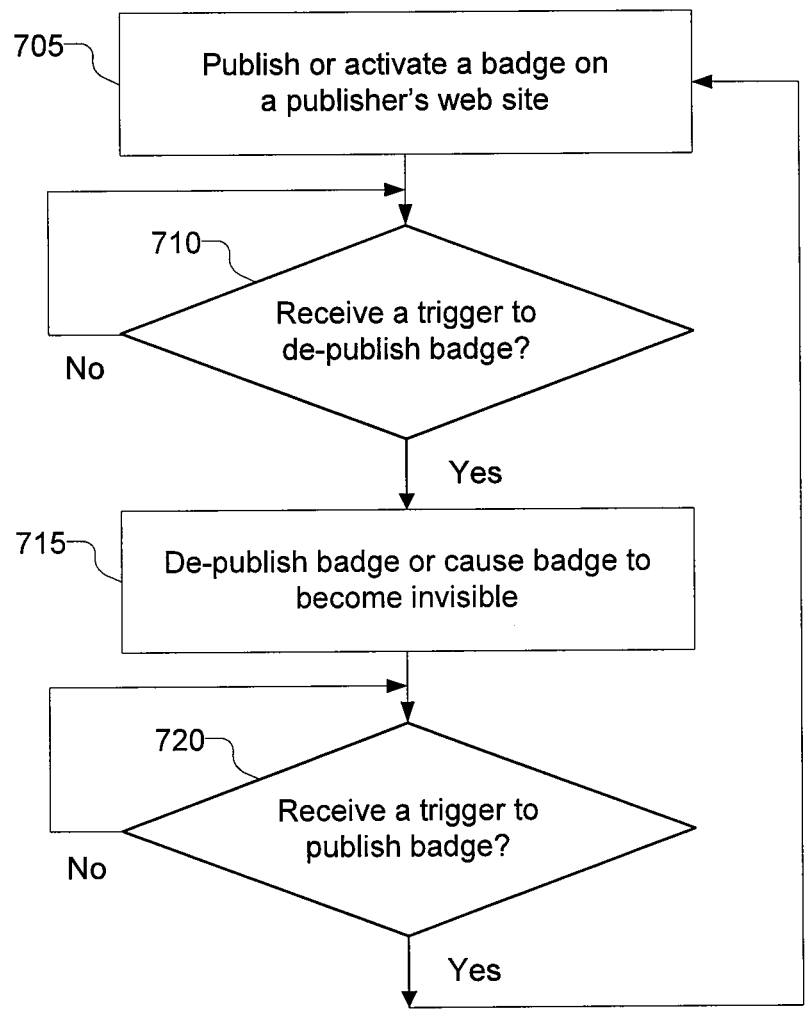
FIG. 7 illustrates a flow chart that may be used to manage a published badge, in accordance with some example embodiments.

FIG. 7 illustrates a flow chart that may be used to manage a visible charity badge, in accordance with some example embodiments. At block 705, when an event occurs, a charity badge may be activated and displayed in a publisher's web page. At block 710, it is determined if a trigger is received to de-activate the charity badge or to make the badge invisible. For example, when the charity badge is associated with a disaster event, it may be appropriate to remove the charity badge sometimes after the event occurs. Removing the charity badge may include causing the charity badge to become invisible (or not visible). For some example embodiments, the trigger may be associated with a predetermined time period after an event occurs. For some example embodiments, the trigger may be determined by the publisher or an event administrator. When the trigger is received, the process may flow to block 715 where the badge may be de-activated.

At block 720, it is determined whether a trigger signal to activate the charity badge is received. If the trigger signal is received, the process may flow to block 705 where the charity badge is activated. If the trigger signal is not received, the process may end. In the current example, the process is illustrated as remaining in block 720 to continue to wait for the trigger signal to activate the charity badge.

Platform Architecture

Figure 8:
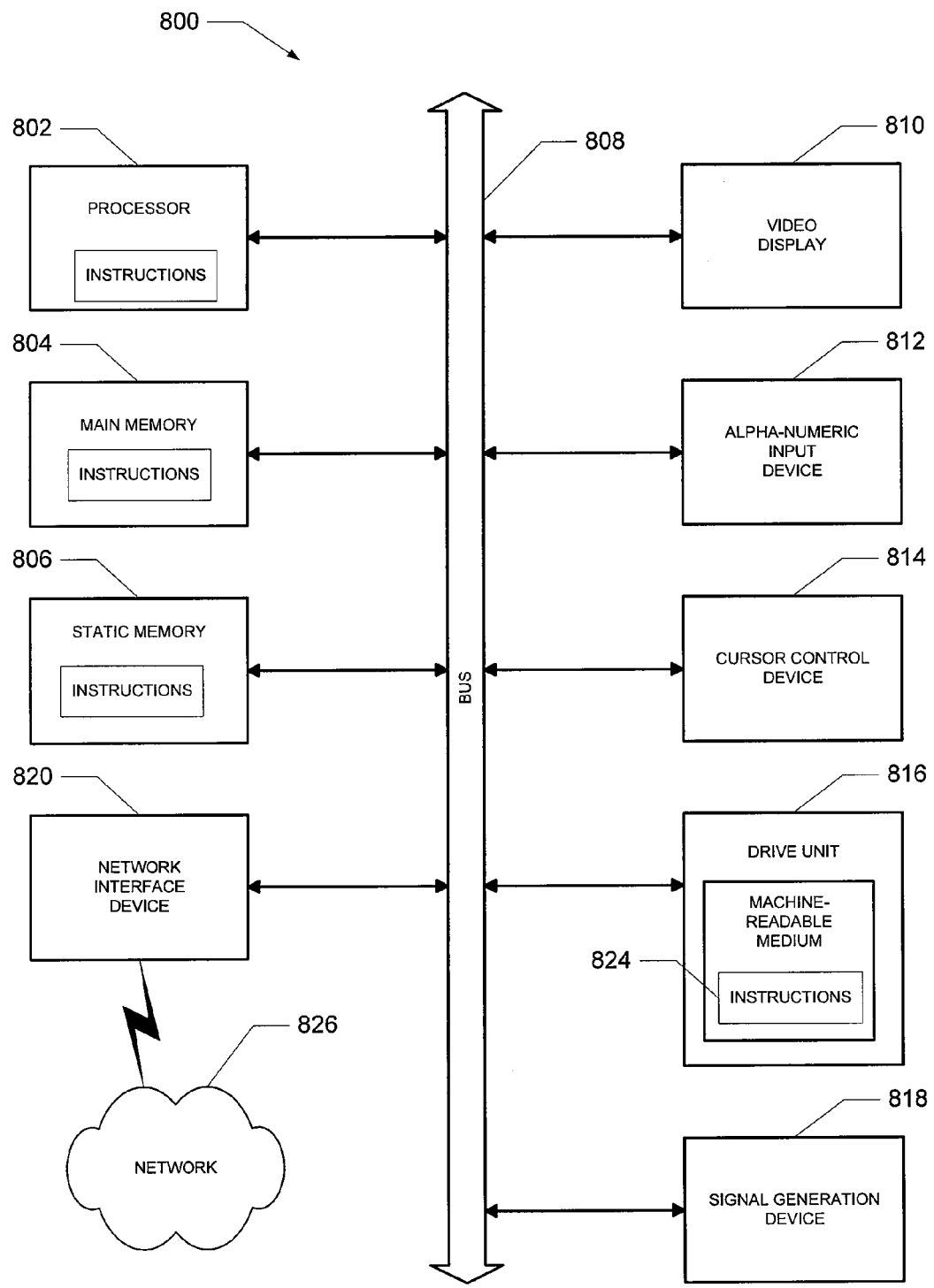
FIG. 8 illustrates a diagrammatic representation of a machine in the form of a computer system within which a set of instructions, for causing the machine to perform any one or more of the methodologies discussed herein, may be executed, according to an example embodiment.

FIG. 8 is a diagram that illustrates an example of a computer system, in accordance with some example embodiments. Computer system 800 may include a set of instructions to be executed. The set of instructions may cause the computer system 800 to automatically perform any one or more of the methodologies discussed herein. In alternative example embodiments, the computer system 800 may operate as a standalone computer system or may be connected (e.g., network) to other computer systems. In a network deployment, the computer system 800 may operate in the capacity of a server or a client system in server-client network environment, or as a peer computer system in a peer-to-peer (or distributed) network environment. The computer system 800 may be a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a television, television cable a pager, a personal trusted device, a web appliance, a network router, switch or bridge, or any machine capable of executing a set of instructions (sequential or otherwise) that specify actions to be taken by that computer system.

Further, while a single computer system is illustrated, the term "system" shall also be taken to include any collection of systems that individually or jointly execute a set (or multiple sets) of electronically-coded instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., liquid crystals display (LCD) or a cathode ray tube (CRT)). The computer system 800 also includes an input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of electronically-coded instructions (e.g., software 824) embodying any one or more of the methodologies or functions described herein. The instructions 824 may also reside, completely or at least partially, within the main memory 804, the static memory 806, and/or within the processor 802 during execution thereof by the computer system 800. The main memory 804 and the processor 802 also may constitute machine-readable media.

The instructions 824 may further be transmitted or received over a network 826 via the network interface device 820.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. FIGS. 1 to 8 are merely representational and may not be drawn to scale. Certain proportions thereof may be exaggerated, while others may be minimized.

Techniques for generating and activating charity badges have been described. An advantage of the techniques is the quick activation or publishing of the charity badge to take advantage of the anticipated high levels of donations right after the disaster events. It is not necessary to scramble to set up the charity badges after a disaster event occurs. It is anticipated that the publishers of web sites that react quickly tend to reap the highest public relation benefit. Another advantage of the techniques described herein is the ability to verify compliance of the receiving charity organizations or the publishers that claim to collect donations for the victims. This may significantly reduce the misdirection of the donations to the scammers. It may be noted that although the descriptions refer to badges for charity donations, the description may be applicable to badges used for different purposes.

The description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the examples of dimensions and ranges are considered typical, the various embodiments are not limited to such dimensions or ranges.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
generating, using at least one processor, codes for a badge to be displayed on a web page of a web site associated with a publisher, the codes generated using information specified by the publisher that includes a specific location on the web page where the badge is to be displayed;
causing the codes for the badge to be embedded in, but not visible on, the web page at the specific location on the web page where the badge is to be displayed prior to an occurrence of an event external to the web site; and
based on the occurrence of the event external to the web site and based on stored publisher preferences matching attributes of the event external to the web site, causing the embedded codes to activate and display the badge on the web page at the specific location specified by the publisher.

2. The method of claim 1, wherein the codes for the badge are generated by an entity other than the publisher.

3. The method of claim 1, wherein the information specified by the publisher includes size information that indicates a specific size of the badge to be displayed at the specific location on the web page.

4. The method of claim 1, wherein the badge is a charity badge, and wherein the information specified by the publisher further includes at least one event type and at least one charity organization that the publisher wants to collect donations for.

5. The method of claim 4, further comprising:
before causing the codes for the badge to be embedded in the web page, determining if the publisher is qualified to collect donations for the charity organization.

6. The method of claim 1, wherein causing the codes are to activate and display the badge on the web page comprises:
comparing the event with an event type specified by the publisher to determine whether the event is supported by the publisher; and
based on the event being supported by the publisher, transmitting a signal to the publisher to display the badge on the web page at the specific location specified by the publisher.

7. The method of claim 3, wherein the badge is displayed on the web page using the specific size specified by the publisher.

8. The method of claim 4, further comprising:
collecting donations from users of the web site of the publisher via a payment facilitator coupled to the web site.

9. The method of claim 8, further comprising:
distributing the donations to the charity organization via the payment facilitator.

10. The method of claim 9, wherein the users and the charity organization are account holders of the payment facilitator.

11. A non-transitory machine-readable medium comprising instructions, which when implemented by one or more processors perform operations comprising:
identifying a charity organization and an event type that a publisher of a web site supports based on information specified by the publisher via a publisher interface provided to the publisher, the information specified by the publisher including a specific location on the web page where the badge is to be displayed;
causing codes associated with a charity badge to be embedded in a web page of the web site at the specific location on the web page where the badge is to be displayed prior to an occurrence of an event external to the web site, the charity badge associated with the charity organization; and
causing the embedded codes to activate and display the badge on the web page at the specific location specified by the publisher based on the occurrence of the event external to the web site supported by the publisher and based on stored publisher preferences matching attributes of the event external to the web site.

12. The non-transitory machine-readable medium of claim 11, further comprising:
causing the codes to make the badge not visible on the web page after a predetermined time period following the occurrence of the event.

13. The non-transitory machine-readable medium of claim 11, wherein the codes are generated based on badge size information and the specific location that is specified by the publisher via the publisher interface.

14. The non-transitory machine-readable medium of claim 13, wherein the codes are generated further based on charity organization information and event type information specified by the publisher via the publisher interface.

15. The non-transitory machine-readable medium of claim 11, further comprising:
directing donations related to the charity badge and received from users of the web site to the charity organization using a payment facilitator, wherein the users and the charity organization are account holders of the payment facilitator.

16. A system comprising:
a processor;
a publisher administration module coupled to the processor to enable a publisher of a web site to specify information about a badge and information about a charity organization that the badge is to solicit donations for, the information about the badge including a specific location on a web page of the web site where the badge is to be displayed;
a compliance module coupled to the publisher administration module and configured to verify whether the publisher is qualified to collect the donations for the charity organization and whether the charity organization is qualified to receive the donations;
a badge generator module coupled to the publisher administration module and configured to generate codes for the badge using the information specified by the publisher, the codes to be embedded in the web page of the web site at the specific location on the web page where the badge is to be displayed prior to an occurrence of an event external to the web site; and a badge publishing module coupled to the badge generator module and configured to cause the embedded codes to activate and display the badge on the web page at the specific location on the web page based on the occurrence of the event external to the web site and based on stored publisher preferences matching attributes of the event external to the web site that triggers the badge to solicit donations, the donations being for the charity organization specified by the publisher.

17. The system of claim 16, further comprising:

a preference and events database configured to store the information about the badge and the information about the charity organization specified by the publisher.

18. The system of claim 16, wherein the badge publishing module is further configured to cause the codes to make the badge not visible after a predetermined period of time following the occurrence of the event.

19. The system of claim 16, wherein the badge publishing module is further configured to cause the codes to make the badge visible for testing purposes.

20. The system of claim 16, wherein based on display of the badge on the web page, shifting existing information on the web page to accommodate the badge.

\* \* \* \* \*